United States Patent
Okazaki et al.

(10) Patent No.: US 12,381,209 B2
(45) Date of Patent: Aug. 5, 2025

(54) NEGATIVE ELECTRODE ACTIVE MATERIAL FOR NONAQUEOUS ELECTROLYTE SECONDARY BATTERY, NEGATIVE ELECTRODE, AND NONAQUEOUS ELECTROLYTE SECONDARY BATTERY

(71) Applicant: Panasonic Intellectual Property Management Co., Ltd., Osaka (JP)

(72) Inventors: Keita Okazaki, Osaka (JP); Norihisa Yamamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 707 days.

(21) Appl. No.: 17/283,066

(22) PCT Filed: Oct. 17, 2019

(86) PCT No.: PCT/JP2019/040800
§ 371 (c)(1),
(2) Date: Apr. 6, 2021

(87) PCT Pub. No.: WO2020/080452
PCT Pub. Date: Apr. 23, 2020

(65) Prior Publication Data
US 2021/0384496 A1    Dec. 9, 2021

(30) Foreign Application Priority Data
Oct. 18, 2018   (JP) .................................. 2018-196954

(51) Int. Cl.
*H01M 4/58*   (2010.01)
*H01M 4/02*   (2006.01)
(Continued)

(52) U.S. Cl.
CPC ......... *H01M 4/386* (2013.01); *H01M 4/5825* (2013.01); *H01M 4/623* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 7,358,011 B2 * | 4/2008 | Fukuoka | H01M 4/366 429/232 |
| 2002/0182488 A1 * | 12/2002 | Cho | H01M 10/052 429/231.95 |

(Continued)

FOREIGN PATENT DOCUMENTS

| | | |
|---|---|---|
| JP | 2015-111547 A | 6/2015 |
| JP | 2015-149221 A | 8/2015 |

(Continued)

OTHER PUBLICATIONS

International Search Report dated Dec. 10, 2019, issued in counterpart application No. PCT/JP2019/040800 (2 pages).

*Primary Examiner* — Lisa S Park
(74) *Attorney, Agent, or Firm* — WHDA, LLP

(57) ABSTRACT

In the present invention, negative electrode active material particles for a nonaqueous electrolyte secondary battery which can suppress decrease of charging and discharging cycle characteristics, are each provided with: a composite particle that includes a silicate phase and silicon particles dispersed in the silicate phase; and a surface layer that covers the composite particle, wherein the surface layer includes a fluorine resin.

18 Claims, 3 Drawing Sheets

(51) Int. Cl.
  *H01M 4/38* (2006.01)
  *H01M 4/62* (2006.01)

(56) References Cited

U.S. PATENT DOCUMENTS

| | | | |
|---|---|---|---|
| 2008/0268342 A1* | 10/2008 | Suzuki | H01M 4/366 |
| | | | 429/231.95 |
| 2016/0013529 A1* | 1/2016 | Yadgar | H01M 12/065 |
| | | | 429/404 |
| 2016/0254525 A1 | 9/2016 | Hirose et al. | |
| 2016/0344019 A1 | 11/2016 | Hirose et al. | |
| 2017/0040599 A1 | 2/2017 | Kamo et al. | |
| 2017/0309950 A1 | 10/2017 | Minami et al. | |
| 2018/0287140 A1 | 10/2018 | Akira et al. | |
| 2018/0287148 A1 | 10/2018 | Akira et al. | |
| 2019/0097223 A1 | 3/2019 | Hirose et al. | |
| 2019/0115617 A1* | 4/2019 | Pan | H01M 4/04 |
| 2019/0148723 A1* | 5/2019 | Saguchi | H01M 4/628 |
| | | | 429/215 |

FOREIGN PATENT DOCUMENTS

| | | |
|---|---|---|
| JP | 2015-156328 A | 8/2015 |
| JP | 2017-97952 A | 6/2017 |
| WO | 2015/107581 A1 | 7/2015 |
| WO | 2016/121320 A1 | 8/2016 |
| WO | 2016/136180 A1 | 9/2016 |
| WO | 2017/051500 A1 | 3/2017 |

* cited by examiner

NEGATIVE ELECTRODE ACTIVE MATERIAL FOR NONAQUEOUS ELECTROLYTE SECONDARY BATTERY, NEGATIVE ELECTRODE, AND NONAQUEOUS ELECTROLYTE SECONDARY BATTERY

TECHNICAL FIELD

The present disclosure relates to a negative electrode active material for a non-aqueous electrolyte secondary battery, a negative electrode, and a non-aqueous electrolyte secondary battery.

BACKGROUND ART

It is known that silicon materials such as silicon (Si) and silicon oxides represented by $SiO_x$ can intercalate more ions such as lithium ions per unit volume than carbon materials such as graphite, and application of such silicon materials to negative electrodes of lithium ion batteries and the like has been contemplated.

For example, Patent Literatures 1 to 3 suggest use of composite particles including silicon and a lithium silicate as a negative electrode active material.

CITATION LIST

Patent Literature

PATENT LITERATURE 1: International Publication No. WO 2017/051500
PATENT LITERATURE 2: International Publication No. WO 2016/121320
PATENT LITERATURE 3: International Publication No. WO 2016/136180

SUMMARY

Use of composite particles including a silicate and silicon particles as a negative electrode active material for a non-aqueous electrolyte secondary battery may lead to a problem of deterioration in the charge/discharge cyclic characteristics in a non-aqueous electrolyte secondary battery.

Thus, an object of the present disclosure is to provide a negative electrode active material for a non-aqueous electrolyte secondary battery that may be suppressed in deterioration in the charge/discharge cyclic characteristics, the negative electrode active material for a non-aqueous electrolyte secondary battery including a composite particle including silicon and a silicate.

A negative electrode active material for a non-aqueous electrolyte secondary battery according to one aspect of the present disclosure comprises a composite particle including a silicate and silicon, and a surface layer coating the composite particle, and the surface layer includes a fluorine resin.

A negative electrode according to one aspect of the present disclosure includes the above negative electrode active material for a non-aqueous electrolyte secondary battery.

A non-aqueous electrolyte secondary battery according to one aspect of the present disclosure comprises the above negative electrode, a positive electrode, and a non-aqueous electrolyte.

According to one aspect of the present disclosure, a negative electrode active material for a non-aqueous electrolyte secondary battery may be provided that can be suppressed in deterioration in the charge/discharge cyclic characteristics.

DESCRIPTION OF EMBODIMENTS

Figure 1:
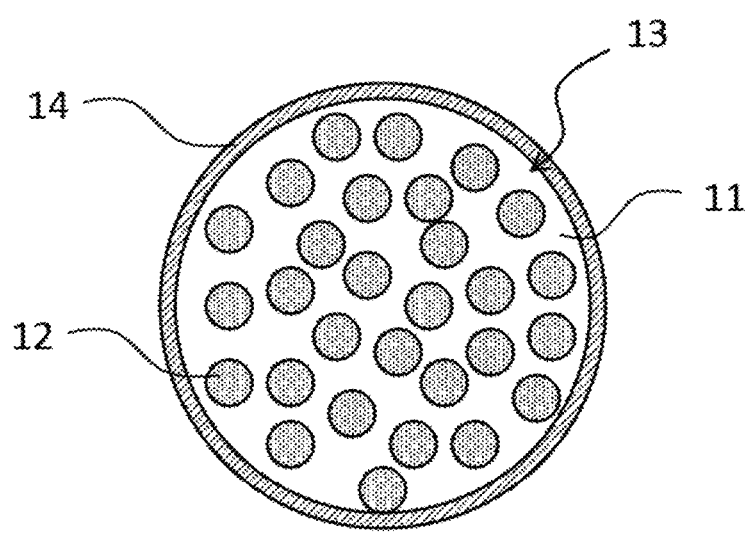
FIG. 1 is a schematic sectional view illustrating a particle of the negative electrode active material as an exemplary embodiment.

The negative electrode active material for a non-aqueous electrolyte secondary battery according to one aspect of the present disclosure comprises a composite particle including a silicate and silicon, and a surface layer coating the composite particle, and the surface layer includes a fluorine resin. Use of the negative electrode active material for a non-aqueous electrolyte secondary battery according to one aspect of the present disclosure enables deterioration in the charge/discharge cyclic characteristics to be suppressed. The mechanism by which the charge/discharge cyclic characteristics deteriorate has not been sufficiently clarified, but the following is presumed.

Usually, in producing a negative electrode for use in a non-aqueous electrolyte secondary battery, composite particles including a silicate and silicon are mixed with an aqueous solvent such as water to prepare a negative electrode slurry. In this case, the silicate in the composite particles reacts with water. Then, hydroxide ions are eluted, and alkalinity is shown. When the silicate is a lithium silicate, a reaction represented by the following formula (1) occurs, for example.

$$Li_2SiO_3 + H_2O \rightarrow SiO_2 + 2Li^+ + OH^- \qquad (1)$$

When the reaction of the formula (1) occurs, the silicon in the composite particles is oxidized under alkalinity. Specifically, water including the hydroxide ions ($OH^- + H_2O$) generated in the above formula (1) reacts with the silicon (Si) in the composite particles to thereby oxidize the silicon. The reaction of the water including the hydroxide ions with the silicon is represented by the following formula (2), for example.

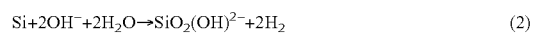

$$Si + 2OH^- + 2H_2O \rightarrow SiO_2(OH)^{2-} + 2H_2 \qquad (2)$$

As in the above formula (2), oxidization of silicon is considered to alter the surface feature of the silicon to thereby cause the silicon to have a high reactivity with a non-aqueous electrolyte. Accordingly, in the non-aqueous electrolyte secondary battery in which the composite particles including an oxidized silicon are used as the negative electrode active material, a decomposition reaction of non-aqueous electrolyte in a charge/discharge process is facilitated and thus, deterioration in the charge/discharge cyclic characteristics is considered to be caused. The reactions of the above formulas (1) and (2) occur also due to moisture mixed in the battery. Thus, reactions of the above formulas (1) and (2) occur in the battery in preparation of the negative electrode even if no aqueous solvent is employed to thereby result in deterioration in the charge/discharge cyclic characteristics.

On the other hand, in the negative electrode active material for a non-aqueous electrolyte secondary battery according to one aspect of the present disclosure, composite particles that include a silicate and silicon are coated with a surface layer including fluorine resin, and thus, contact between the composite particles and water is suppressed. Thereby, as in the above formula (1), the reaction between the silicate and water is suppressed to thereby suppress the reaction of the water including the hydroxide ions ($OH^-$ + $H_2O$) generated in the above formula (1) with silicon. Thus, oxidization of the silicon is suppressed. Accordingly, in a non-aqueous electrolyte secondary battery using the negative electrode active material for a non-aqueous electrolyte secondary battery according to one aspect of the present disclosure, decomposition of the non-aqueous electrolyte in a charge/discharge process is suppressed and thus, deterioration in the charge/discharge cyclic characteristics is considered to be suppressed.

The negative electrode usually includes a thickener such as carboxymethyl cellulose in order to improve the bindability among the composite particles, but the thickener may be decomposed by the water including the hydroxide ions generated in the above formula (1). Deterioration in the bindability among the composite particles due to the decomposition of the thickener may lead to deterioration in the charge/discharge cyclic characteristics. However, according to the negative electrode including the negative electrode active material for a non-aqueous electrolyte secondary battery according to one aspect of the present disclosure, as mentioned above, the reaction of the above formula (1) is suppressed, and thus, the decomposition of the thickener is also suppressed. Accordingly, deterioration in the bindability among the composite particles is suppressed.

Hereinafter, a non-aqueous electrolyte secondary battery using the negative electrode active material according to one aspect of the present disclosure will be described.

The drawing referred for the description of embodiments is schematically illustrated, and the dimensions, the proportion, and the like of the components illustrated in the drawing may be different from those of actual products. Specific dimensions, the proportion, and the like should be determined in consideration of the description below.

A non-aqueous electrolyte secondary battery according to one example of an embodiment comprises a negative electrode, a positive electrode, and a non-aqueous electrolyte. A separator is preferably disposed between the positive electrode and the negative electrode. An exemplary structure of the non-aqueous electrolyte secondary battery is a structure in which an electrode assembly formed by winding the positive electrode and the negative electrode together with the separator therebetween and the non-aqueous electrolyte are housed in an exterior body. Alternatively, instead of the wound-type electrode assembly, an electrode assembly in a different form may be used, such as a layered electrode assembly in which a positive electrode and a negative electrode are layered with a separator therebetween. The non-aqueous electrolyte secondary battery may be any form including a cylindrical shape, a rectangular shape, a coin shape, a button shape, and a laminated shape.

[Positive Electrode]

The positive electrode preferably includes a positive electrode current collector formed of a metal foil or the like, and a positive electrode mixture layer formed on the current collector. A foil of a metal that is stable in the electric potential range of the positive electrode, such as aluminum, a film with such a metal disposed as an outer layer, and the like can be used for the positive electrode current collector. The positive electrode mixture layer preferably includes a conductive agent, a binder, and the like, in addition to the positive electrode active material. The surface of the particle of the positive electrode active material may be coated with micro particles of an oxide such as aluminum oxide ($Al_2O_3$) or an inorganic compound such as a phosphoric acid compound or a boric acid compound.

The positive electrode can be obtained by coating the positive electrode current collector with a positive electrode slurry including, for example, a positive electrode active material, a conductive agent, a binder, an appropriate solvent, and the like, followed by drying and rolling. Preferable examples of the solvent include organic solvents such as N-methyl-2-pyrrolidone (NMP).

Examples of the positive electrode active material include a lithium transition metal oxide, which contains a transition metal element such as Co, Mn, or Ni. Examples of the lithium transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (M; at least one of the group consisting of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$). These may be used singly or two or more thereof may be mixed and used.

The conductive agent is used, for example, for improving the electroconductive properties of the positive electrode mixture layer. Examples of the conductive agent include carbon materials such as carbon black, acetylene black, Ketjen black, and graphite. These may be used singly or in combinations of two or more thereof.

The binder is used, for example, for maintaining a good contact condition between the positive electrode active material and the conductive agent and improving the bindability of the positive electrode active material and the like to the surface of the positive electrode current collector. Examples of the binder can include fluoro resins, such as polytetrafluoroethylene (PTFE) and poly(vinylidene fluoride) (PVdF), polyacrylonitrile (PAN), styrene-butadiene rubber (SBR), poly(acrylic acid) (PAA) or a salt thereof (e.g., PAA-Na or PAA-K which may be a partially neutralized salt), and poly(vinyl alcohol) (PVA). The binder may be combined with a thickener, such as carboxymethyl cellulose (CMC) or a salt thereof (e.g., CMC-Na, CMC-K, or CMC-$NH_4$ which may be a partially neutralized salt), and polyethylene oxide (PEO).

[Negative Electrode]

The negative electrode preferably includes a negative electrode current collector formed of a metal foil or the like, and a negative electrode mixture layer formed on the current collector. Foil of a metal that is stable in the electric potential range of the negative electrode, such as copper, a film with such a metal disposed as an outer layer, and the like can be used for the negative electrode current collector. The negative electrode mixture layer preferably includes a binder and the like, in addition to the negative electrode active material.

The negative electrode can be obtained by coating the negative electrode current collector with a negative electrode slurry including, for example, a negative electrode active material, a binder, an appropriate solvent, and the like, followed by drying and rolling. Preferable examples of the solvent include aqueous solvents such as water.

Examples of the binder can include fluoro resins, polyacrylonitrile (PAN), styrene-butadiene rubber (SBR), poly(acrylic acid) (PAA) or a salt thereof (e.g., PAA-Na or PAA-K which may be a partially neutralized salt), and poly(vinyl alcohol) (PVA), as in the case of the positive electrode. The binder is preferably a binder including no fluorine in view of effective suppression of deterioration in the charge/discharge cyclic characteristics of the non-aqueous electrolyte secondary battery. Among the examples described above, in particular, styrene-butadiene rubber (SBR), poly(acrylic acid) (PAA) or a salt thereof (e.g., PAA-Na or PAA-K which may be a partially neutralized salt), and poly(vinyl alcohol) (PVA) are preferred. The binder may be combined with a thickener, such as CMC or a salt thereof (e.g., CMC-Na, CMC-K, or CMC-NH$_4$ which may be a partially neutralized salt) and polyethylene oxide (PEO).

The negative electrode active material comprises a composite particle including a silicate and silicon and a surface layer coating the composite particle, and the surface layer includes a fluorine resin. Here, the composite particle means one in which a silicate component and a silicon component are dispersed in the surface of the composite particles and in the bulk thereof. An exemplary composite particle is a composite particle including a silicate phase and silicon particles dispersed in the silicate phase. The silicate phase is an aggregate of silicate particles. Alternatively, the composite particle may be a composite particle including a silicon phase and silicate particles dispersed in the silicon phase and the like. The silicon phase is an aggregate of silicon particles.

Hereinafter, the negative electrode active material of the present disclosure will be described more concretely in reference to the drawings. As an example of the composite particle, a composite particle including a silicate phase and silicon particles dispersed in the silicate phase will be described. However, the composite particle in the present disclosure is not limited to a composite particle including a silicate phase and silicon particles dispersed in the silicate phase, and may be a composite particle including a silicon phase and silicate particles dispersed in the silicon phase as mentioned above, or may be a mixture of these composite particles and the like.

FIG. 1 shows a schematic sectional view of a particle of the negative electrode active material as an exemplary embodiment. A particle 10 of the negative electrode active material exemplified in FIG. 1 comprises a composite particle 13 having a silicate phase 11 and silicon particles 12 dispersed in the phase. That is, the composite particle 13 illustrated in FIG. 1 has a sea/island structure in which the fine silicon particles 12 are dispersed in the silicate phase 11. The silicon particles 12, at any cross section of the composite particle 13, are preferably scattered substantially uniformly without being unevenly distributed in some regions. The composite particle 13 illustrated in FIG. 1, which has a particle structure in which the silicon particles 12 of a small particle size are dispersed in the silicate phase 11, is preferred in view that the volume change of the silicon particles 12 due to the charge/discharge reaction is reduced to thereby prevent breakage of the particle structure.

The particle 10 of the negative electrode active material exemplified in FIG. 1 additionally comprises a surface layer 14 coating the composite particle 13 formed of the silicate phase 11 and the silicon particles 12, the surface layer 14 including a fluorine resin. In the particle 10 of the negative electrode active material exemplified in FIG. 1, the surface layer 14 is formed on the entire surface of the composite particle 13, but the surface layer 14 may be formed on a portion of the surface of the composite particle 13. Whether the surface layer 14 including a fluorine resin is formed on the surface of the composite particle 13 is determined by, for example, observing the surface of the composite particle 13 with an SEM and evaluating the SEM-observed image with EDS (energy dispersive spectroscopy).

The fluorine resin forming the surface layer 14 includes at least one of the group consisting of polytetrafluoroethylene (PTFE), poly(vinylidene fluoride) (PVdF), perfluoroalkoxy alkane (PFA), perfluoroethylene propene copolymer (FEP), ethylene tetrafluoroethylene copolymer (ETFE), polychlorotrifluoroethylene (PCTFE), and ethylene chlorotrifluoroethylene copolymer (ECTFE). Among these, polytetrafluoroethylene (PTFE) and poly(vinylidene fluoride) (PVdF) are preferred in view of easiness of formation of the surface layer 14. One of these may be used singly, or two or more of these may be used in combination.

The surface layer 14 suppresses the contact between the composite particle 13 and water. Thus, the reaction between the silicate phase 11 and water and the reaction between the water including hydroxide ions (OH$^-$+H$_2$O), which is generated by the reaction between the silicate phase 11 and water, and the silicon particles 12 are suppressed to thereby suppress oxidization of the silicon particles 12. As a result, decomposition of the non-aqueous electrolyte in the charge/discharge process is suppressed to thereby suppress deterioration of the charge/discharge cyclic characteristics. Decomposition of the thickener by the water including hydroxide ions (OH$^-$+H$_2$O) is considered to be suppressed. Thus, deterioration in the bindability among the particles 10 of the negative electrode active material (among the composite particles 13) is also suppressed. This suppression of deterioration in the bindability among the particles 10 of the negative electrode active material (among the composite particles 13) is considered to also contribute to the effect of suppressing deterioration in the charge/discharge cyclic characteristics.

The amount of the surface layer 14 is preferably in the range of 0.01 mass % to 10 mass % and more preferably 0.5 mass % to 2 mass % with respect to the composite particle 13. When the amount of the surface layer 14 is less than 0.01 mass %, for example, the composite particle 13 cannot be sufficiently coated with the surface layer 14, and thus, deterioration in the charge/discharge cyclic characteristics cannot be sometimes effectively suppressed. When the amount of the surface layer 14 exceeds 10 mass %, for example, the surface layer 14 may thicken excessively, and the conductivity of the particle 10 of the negative electrode active material may decrease to lead to decrease in the capacity of the battery sometimes. The thickness of the surface layer 14 is, for example, preferably in the range of 1 nm to 3000 nm and more preferably in the range of 1 to 200 nm. When the thickness of the surface layer 14 is less than 1 nm, for example, deterioration in the charge/discharge cyclic characteristics cannot be sometimes effectively suppressed. For example, a thickness more than 3000 nm may lead to decrease in the capacity of the battery sometimes.

For example, in view of low reactivity with water, in view of a good lithium ionic conductive property, and the like, the silicate phase 11 preferably includes a lithium silicate represented by Li$_x$SiO$_y$ (0<x≤4, 0<y≤4), more preferably includes a lithium silicate represented by Li$_{2z}$SiO$_{(2+z)}$ (0<z<2), and particularly preferably includes Li$_2$SiO$_3$ (Z=1) or Li$_2$Si$_2$O$_5$ (Z=1/2), as the principal component. When $Li_2SiO_3$ or $Li_2Si_2O_5$ is included as the principal component (the component of the largest mass), the content of the principal component is preferably more than 50 mass % and more preferably 80 mass % or more based on the total mass of the silicate phase 11.

The silicate phase 11 is not limited to a lithium silicate, but all silicates that can be used as a negative electrode active material can be used. An example of such silicates is a sodium silicate. The silicate sodium preferably includes a sodium silicate represented by $Na_2O \cdot XSiO_2$ ($1 \leq X \leq 9$), for example, in view of good lithium ionic conductivity and the like.

The silicate phase 11 is preferably formed of, for example, particles further finer than the silicon particles 12 in view of reduction in the volume change of the silicon particles 12 due to charge/discharge and the like. In an XRD pattern of the particle 10 of the negative electrode active material, for example, the intensity of the diffraction peak of the (111) plane of Si is greater than the intensity of the diffraction peak of the (111) plane of the silicate.

The silicon particles 12, which can intercalate more lithium ions than carbon materials such as graphite, is considered to contribute to a larger capacity of a battery. The content of the silicon particles 12 in the composite particle 13 is preferably 20 mass % to 95 mass % and more preferably 35 mass % to 75 mass % based on the total mass of the composite particle 13 in view of a larger capacity, the improvement in the charge/discharge cyclic characteristics, and the like.

The average particle size of the silicon particles 12 is, for example, preferably in the range of 1 nm to 1000 nm and more preferably in the range of 1 nm to 100 nm in view of suppression of the volume change upon charge/discharge, prevention of the breakage of the electrode structure, and the like. Meanwhile, in consideration of easiness of production of the composite particle 13 and the like, the average particle size is preferably in the range of 200 nm to 500 nm. The average particle size of the silicon particles 12 is determined through observation of the cross section of the particle 10 of the negative electrode active material using a scanning electron microscope (SEM) or a transmission electron microscope (TEM), and specifically, is obtained by averaging the longest particle diameters of one hundred silicon particles 12.

The composite particle 13 preferably has a half width of the diffraction peak of the (111) plane of the silicate of 0.05° or more in the XRD pattern obtained by XRD measurement. Adjustment of the half width to 0.05° or more is considered to lead to decrease in the crystallinity the silicate phase 11, improvement in the lithium ionic conductivity in the particle, and further relief of the volume change of the silicon particles 12 due to the charge/discharge. The half width of the diffraction peak of the (111) plane of a preferable silicate, which slightly depends on the components of the silicate phase 11, is more preferably 0.09° or more, for example, 0.09° to 0.55°.

The half width of the diffraction peak of the (111) plane of the above silicate is measured under the following conditions. When a plurality of silicates are included, the half width (° (2θ)) of the peak of the (111) plane of each of all the silicates is measured. When the diffraction peak of the (111) plane of the silicate overlaps the diffraction peak of a different plane index or the diffraction peak of a different substance, the diffraction peak of the (111) plane of the silicate is isolated for measurement of the half width.

Measurement apparatus: X-ray diffraction measurement apparatus (model: RINT-TTRII) manufactured by Rigaku Corporation
Anticathode: Cu
Tube voltage: 50 kv
Tube current: 300 mA
Optical system: collimated beam method
[incident side: multilayer film mirror (divergence angle: 0.05°, beam width: 1 mm), soller slit (5°), light-receiving side: elongate slit PSA200 (resolution: 0.057°), soller slit) (5°)]
Scan step: 0.01° or 0.02°
Counting time: 1 to 6 seconds When the silicate phase 11 includes $Li_2Si_2O_5$ as the principal component, the half width of the diffraction peak of the (111) plane of $Li_2Si_2O_5$ in the XRD pattern of the particle 10 of the negative electrode active material is preferably 0.09° or more. For example, when $Li_2Si_2O_5$ is 80 mass % or more based on the total mass of the silicate phase 11, a preferable exemplary half width of the diffraction peak is 0.09° to 0.55°. Alternatively, when the silicate phase 11 includes $Li_2SiO_3$ as the principal component, the half width of the diffraction peak of the (111) plane of $Li_2SiO_3$ in the XRD pattern of the particle 10 of the negative electrode active material is preferably 0.10° or more. For example, when $Li_2SiO_3$ is 80 mass % or more based on the total mass of the silicate phase 11, a preferable exemplary half width of the diffraction peak is 0.10° to 0.55°.

The average particle size of the particles 10 of the negative electrode active material is preferably 1 to 15 μm and more preferably 4 to 10 μm in view of a larger capacity, the improvement in the cyclic characteristics, and the like. Here, the average particle size of the particles 10 of the negative electrode active material, which is the particle size of the primary particles, means a diameter (a volume average particle size) at an integrated volume of 50% in the particle size distribution analyzed according to the laser diffraction/scattering method (using, for example, "LA-750" manufactured by HORIBA, Ltd.). If the average particle size of the particles 10 of the negative electrode active material is too small, the surface area thereof is larger, and therefore the amount thereof reacting with an electrode is likely to be larger to result in decrease in the capacity. On the other hand, if the average particle size is too large, the change in the volume due to charge/discharge may be larger, and thus, the charge/discharge cyclic characteristics tend to deteriorate.

Figure 2:
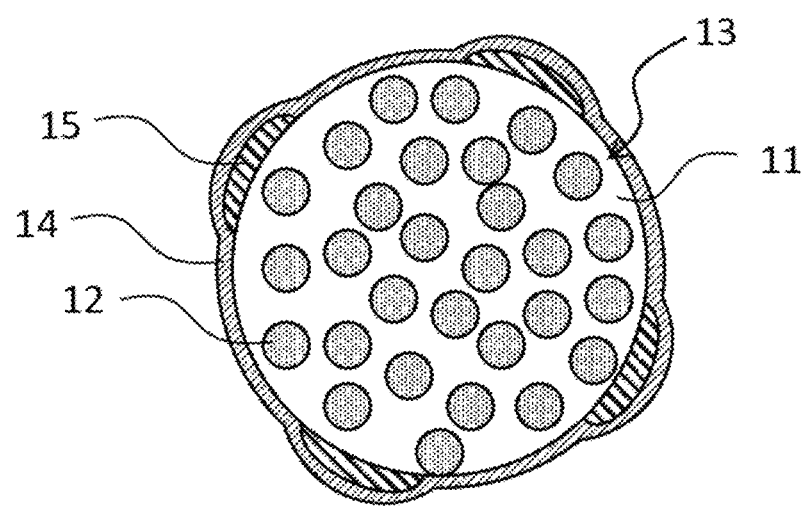
FIG. 2 is a schematic sectional view illustrating a particle of the negative electrode active material as another exemplary embodiment.

FIG. 2 is a schematic sectional view illustrating a particle of the negative electrode active material as another exemplary embodiment. A particle 10 of the negative electrode active material illustrated in FIG. 2 comprises a composite particle 13 including a silicate phase 11 and silicon particles 12 dispersed in the silicate phase 11, a conductive layer 15 formed on the surface of the composite particle 13, and a surface layer 14 coating the composite particle 13 and the conductive layer 15. In the particle 10 of the negative electrode active material illustrated in FIG. 2, the conductive layer 15 is formed on a portion of the surface of the composite particle 13, but the conductive layer 15 may be formed on the entire surface of the composite particle 13. When the conductive layer 15 is formed on the entire surface of the composite particle 13, the surface layer 14 is formed on the entire surface of or a portion of the surface of the conductive layer 15.

The material for forming the conductive layer 15 is preferably electrochemically stable, and is preferably at least one selected from the group consisting of a carbon material, a metal, and a metal compound. As the carbon material, carbon black, acetylene black, Ketjen black, graphite, and a mixture of two or more thereof can be used, as in the conductive material for the positive electrode mixture layer. As the metal, copper, nickel, and an alloy thereof that is stable in the electric potential range of the negative electrode can be used. Examples of the metal compound include a copper compound and a nickel compound. Among these, the carbon material is particularly preferably used.

The thickness of the conductive layer 15 is preferably 1 to 200 nm and more preferably 5 to 100 nm in view of the diffusibility of lithium ions into the composite particles 13. The thickness of the conductive layer 15 can be measured through the observation of the cross section of the particle using SEM, TEM, or the like.

As the negative electrode active material, the particles 10 of the negative electrode active material may be used alone, or may be combined with another conventionally known active material. As the another active material, a carbon material such as graphite is preferable in view of a smaller volume change due to charge/discharge than that of silicon and the like. Examples of the carbon material include natural graphite such as flaky graphite, massive graphite, or earthy graphite, or artificial graphite such as massive artificial graphite (MAG) or graphitized mesophase carbon microbeads (MCMB). The mass ratio of the particle 10 of the negative electrode active material and the carbon material is preferably 1:99 to 30:70. When the mass ratio of the particle 10 of the negative electrode active material and the carbon material is within the range, a larger capacity and the improvement in the cyclic characteristics are likely to be simultaneously achieved.

The composite particles 13 are produced through, for example, the following steps 1 to 3. All the following steps are performed in an inert atmosphere.
(1) A Si powder and a silicate powder each ground to have an average particle size of approximately several micrometers to several tens of micrometers are mixed in a mass ratio of, for example, 20:80 to 95:5 to produce a mixture.
(2) Then, the mixture is ground for atomization in a ball mill. Alternatively, the material powders may be each atomized and then mixed to produce a mixture.
(3) The ground mixture is heat-treated at, for example, 600 to 1000° C. In this heat treatment, pressure may be applied to the mixture, as in hot press, to produce a sintered compact of the mixture. Alternatively, the Si particles and the lithium silicate particles may be mixed and heat-treated without using a ball mill.

An example of a method for forming a surface layer 14 including a fluorine resin on the surface of the composite particles 13 is a method including spraying the composite particles 13 with a slurry for surface layer obtained by dispersing a fluorine resin in a solvent, and drying the slurry coating. Preferred examples of the solvent in which the fluorine resin is dispersed include alcohol solvents. The preferred drying temperature is, for example, in the range of 50° C. to 150° C.

Examples of a method for forming a conductive layer 15 on the surface of the composite particle 13 include, when the conductive layer 15 is formed of a carbon material, a CVD method involving using acetylene, methane, or the like, and a method in which the composite particles 13 are mixed and heat-treated with coal pitch, petroleum pitch, a phenol resin, or the like. Alternatively, carbon black, Ketjen black, or the like may be adhered to the surface of the composite particles 13 with a binder. When the conductive layer 15 is formed of a metal or a metal compound, examples of the method include a method including forming the conductive layer 15 on the surface of the composite particle 13 by nonelectrolytic plating.

[Non-Aqueous Electrolyte]

The non-aqueous electrolyte includes a non-aqueous solvent and an electrolyte salt dissolved in the non-aqueous solvent. The non-aqueous electrolyte is not limited to a liquid electrolyte (non-aqueous electrolyte solution) and may be a solid electrolyte using a gel polymer or the like. As the non-aqueous solvent, esters, for example, ethers, nitriles such as acetonitrile, amides such as dimethylformamide, and mixed solvents of two or more thereof can be used. The non-aqueous solvent may contain a halogen-substituted product formed by replacing at least one hydrogen atom of any of the above solvents with a halogen atom such as fluorine.

Examples of the esters include cyclic carbonate esters, such as ethylene carbonate (EC), propylene carbonate (PC), and butylene carbonate; chain carbonate esters, such as dimethyl carbonate (DMC), methyl ethyl carbonate (EMC), diethyl carbonate (DEC), methyl propyl carbonate, ethyl propyl carbonate, and methyl isopropyl carbonate; cyclic carboxylate esters such as γ-butyrolactone (GBL) and γ-valerolactone (GVL); and chain carboxylate esters such as methyl acetate, ethyl acetate, propyl acetate, methyl propionate (MP), ethyl propionate, and γ-butyrolactone.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the halogen-substituted product preferable for use include a fluorinated cyclic carbonate ester such as fluoroethylene carbonate (FEC), a fluorinated chain carbonate ester, and a fluorinated chain carboxylate ester such as methyl fluoropropionate (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ ($1<x<6$, n is 1 or 2), $LiB_{10}Cl_{10}$, LiCl, LiBr, LiI, chloroborane lithium, lithium lower aliphatic carboxylate, borates such as $Li_2B_4O_7$ and $Li(B(C_2O_4)F_2)$, and imide salts such as $LiN(SO_2CF_3)_2$, $LiN(C_lF_{2l+1}SO_2)(C_mF_{2m+1}SO_2)$ (wherein 1 and m are integers of 0 or more). These lithium salts may be used singly or two or more thereof may be mixed and used. Among these, $LiPF_6$ is preferably used in view of ionic conductivity, electrochemical stability, and other properties. The concentration of the lithium salt is preferably 0.8 to 1.8 mol per 1 L of the non-aqueous solvent.

[Separator]

An ion-permeable and insulating porous sheet is used as the separator. Specific examples of the porous sheet include a microporous thin film, woven fabric, and nonwoven fabric. Suitable examples of the material for the separator include olefin resins such as polyethylene and polypropylene, and cellulose. The separator may be a laminate including a cellulose fiber layer and a layer of fibers of a thermoplastic resin such as an olefin resin.

EXAMPLES

Hereinafter, the present disclosure will be described in more detail by way of Examples, but the present disclosure is not limited thereby.

Example 1

[Preparation of Negative Electrode Active Material]

Composite particles formed of equimolar amounts of Si and $Li_2SiO_3$ (average primary particle size of composite particles: 10 average primary particle size of Si: 100 nm) were provided. The result of measurement of the amount of Si in the composite particles by ICP (manufactured by SII NanoTechnology Inc., ICP emission spectral analyzer, SPS3100) was 42 wt %. The average primary particle sizes of the particles are measurement values obtained using a particle size distribution analyzer (manufactured by SHIMADZU CORPORATION, particle size analyzer, SLAD2000). As a result of observation of the cross sections of the composite particles with an SEM, it was confirmed that the Si particles were substantially uniformly dispersed in the $Li_2SiO_3$ phase.

A slurry for surface layer was provided by mixing polytetrafluoroethylene (PTFE) and an isopropyl alcohol solvent (mass ratio: 1:20). Then, the composite particles were sprayed with the above slurry for surface layer such that the amount of the surface layer coating the composite particles was 0.1 mass % with respect to the composite particles. After spraying, the slurry was dried at 100° C. for about 3 hours. The particles dried were used as a negative electrode active material. The surface of this negative electrode active material was observed with an SEM, and the fluorine component in the surface of the negative electrode active material in the SEM image was analyzed with EDS.

Figure 3A:
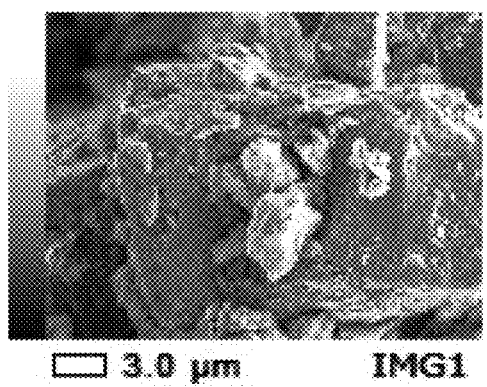
FIG. 3(A) is an SEM image of the surface of the negative electrode active material of Example 1.
Figure 3B:
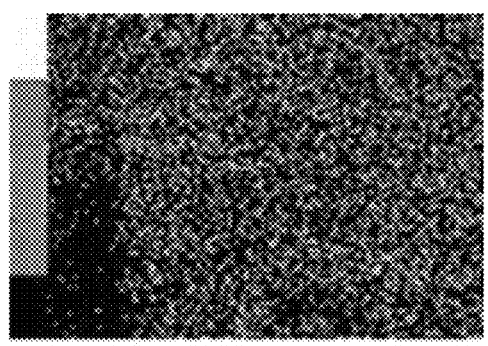
FIG. 3(B) is an SEM image showing a fluorine component present on the surface of the negative electrode active material of Example 1.

FIG. 3(A) is an SEM image of the surface of the negative electrode active material of Example 1, and FIG. 3(B) is an SEM image showing the fluorine component present on the surface of the negative electrode active material of Example 1. FIG. 3(B) is an SEM image obtained by the EDS analysis mentioned above, in which white regions indicate the fluorine component. As can be seen from FIG. 3(B), such white regions (fluorine component) were confirmed to be present over the entire surface of the negative electrode active material of Example 1. Thereby, it can be said that a surface layer including PTFE has been formed over the entire surface of the composite particles.

[Preparation of Negative Electrode Slurry]

The negative electrode active material obtained above, graphite, CMC, and SBR were mixed at a mass ratio of 92.625:4.875:1.5:1.0, and the mixture was diluted with pure water. The resultant was stirred in a mixer (manufactured by PRIMIX Corporation, ROBOMIX) to prepare a negative electrode slurry. The negative electrode slurry prepared had a pH of 9.2.

Example 2

A negative electrode active material was prepared in the same manner as in Example 1 except that the composite particles were sprayed with the slurry for surface layer such that the amount of the surface layer coating the composite particles was 1 mass % with respect to the composite particles. As a result of the EDS analysis performed on the surface of negative electrode active material in the same manner as in Example 1, it was confirmed that a surface layer including PTFE was formed over the entire surface of the composite particles. Additionally, a negative electrode slurry was prepared in the same manner as in Example 1 except that the negative electrode active material obtained in Example 2 was used. The negative electrode slurry of Example 2 had a pH of 8.5.

Example 3

A negative electrode active material was prepared in the same manner as in Example 1 except that the composite particles were sprayed with the slurry for surface layer such that the amount of the surface layer coating the composite particles was 2 mass % with respect to the composite particles. As a result of the EDS analysis performed on the surface of negative electrode active material in the same manner as in Example 1, it was confirmed that a surface layer including PTFE was formed over the entire surface of the composite particles. Additionally, a negative electrode slurry was prepared in the same manner as in Example 1 except that the negative electrode active material obtained in Example 3 was used. The negative electrode slurry of Example 3 had a pH of 8.2.

Example 4

A negative electrode active material was prepared in the same manner as in Example 1 except that the composite particles were sprayed with the slurry for surface layer such that the amount of the surface layer coating the composite particles was 5 mass % with respect to the composite particles. As a result of the EDS analysis performed on the surface of negative electrode active material in the same manner as in Example 1, it was confirmed that a surface layer including PTFE was formed over the entire surface of the composite particles. Additionally, a negative electrode slurry was prepared in the same manner as in Example 1 except that the negative electrode active material obtained in Example 4 was used. The negative electrode slurry of Example 4 had a pH of 8.1.

Example 5

A negative electrode active material was prepared in the same manner as in Example 1 except that a slurry for surface layer was provided by mixing polyvinylidene fluoride (PVdF) and an isopropyl alcohol solvent (mass ratio: 1:20) and that the composite particles were sprayed with the slurry for surface layer such that the amount of the surface layer coating the composite particles was 1 mass % with respect to the composite particles. As a result of the EDS analysis performed on the surface of negative electrode active material in the same manner as in Example 1, it was confirmed that a surface layer including PVdF was formed over the entire surface of the composite particles. Additionally, a negative electrode slurry was prepared in the same manner as in Example 1 except that the negative electrode active material obtained in Example 5 was used. The negative electrode slurry of Example 5 had a pH of 9.1.

Example 6

A negative electrode active material was prepared in the same manner as in Example 1 except that a slurry for surface layer was provided by mixing perfluoroalkoxy alkane (PFA) and an isopropyl alcohol solvent (mass ratio: 1:20) and that the composite particles were sprayed with the slurry for surface layer such that the amount of the surface layer coating the composite particles was 1 mass % with respect to the composite particles. As a result of the EDS analysis performed on the surface of negative electrode active material in the same manner as in Example 1, it was confirmed that a surface layer including PFA was formed over the entire surface of the composite particles. Additionally, a negative electrode slurry was prepared in the same manner as in Example 1 except that the negative electrode active material obtained in Example 6 was used. The negative electrode slurry of Example 6 had a pH of 8.7.

Example 7

A negative electrode active material was prepared in the same manner as in Example 1 except that a slurry for surface layer was provided by mixing ethylene-tetrafluoroethylene copolymer (ETFE) and an isopropyl alcohol solvent (mass ratio: 1:20) and that the composite particles were sprayed with the slurry for surface layer such that the amount of the surface layer coating the composite particles was 1 mass % with respect to the composite particles. As a result of the EDS analysis performed on the surface of negative electrode active material in the same manner as in Example 1, it was confirmed that a surface layer including ETFE was formed over the entire surface of the composite particles. Additionally, a negative electrode slurry was prepared in the same manner as in Example 1 except that the negative electrode active material obtained in Example 7 was used. The negative electrode slurry of Example 7 had a pH of 9.3.

Comparative Example 1

Figure 4A:
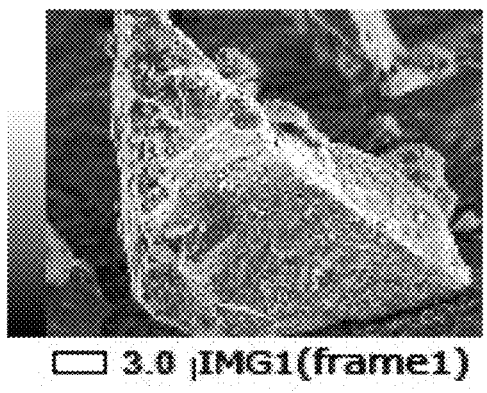
FIG. 4(A) is an SEM image of the surface of the negative electrode active material of Comparative Example 1.
Figure 4B:
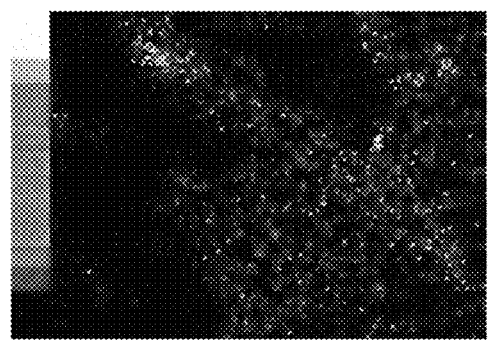
FIG. 4(B) is an SEM image showing a fluorine component present on the surface of the negative electrode active material of Comparative Example 1.

The composite particles used in Example 1 was used as the negative electrode active material. FIG. 4(A) is an SEM image of the surface of the negative electrode active material of Comparative Example 1, and FIG. 4(B) is an SEM image showing the fluorine component present on the surface of the negative electrode active material of Comparative Example 1. FIG. 4(B) is an SEM image obtained by the EDS analysis mentioned above, in which white regions indicate the fluorine component. As can be seen from FIG. 4(B), few white regions (fluorine component) were confirmed to be present on the surface of the negative electrode active material (composite particles) of Example 1. The white regions shown in FIG. 4(B) are considered to detect distribution of iron present as an impurity of the negative electrode active material (the characteristic X-ray of fluorine is close to that of iron). In other words, it can be said that no surface layer including fluorine has been formed on the surface of the composite particles. Additionally, a negative electrode slurry was prepared in the same manner as in Example 1 except that the negative electrode active material of Comparative Example 1 was used. The negative electrode slurry of Comparative Example 1 had a pH of 11.2.

A non-aqueous electrolyte secondary battery was produced as follows using each of the negative electrode slurries of Examples 1 to 7 and Comparative Example 1.

[Preparation of Negative Electrode]

The negative electrode slurry prepared above was applied to both the surfaces of a copper foil so that the mass of the negative electrode mixture layer per 1 $m^2$ was 20 g/$m^2$. Next, the coating was dried at 105° C. in atmospheric air, and then rolled to prepare a negative electrode. The packing density of the negative electrode mixture layer was 1.60 g/ml.

[Preparation of Non-Aqueous Electrolyte Solution]

To a mixed solvent obtained by mixing ethylene carbonate (EC), methyl ethyl carbonate (MEC), and diethyl carbonate (DEC) at a volume ratio of 3:6:1, lithium hexafluorophosphate (LiPF$_6$) was added at 1.0 mol/L to prepare a non-aqueous electrolyte solution.

[Preparation of Positive Electrode]

Lithium cobaltate, acetylene black (manufactured by Denka Company Limited, HS100), and polyvinylidene fluoride (PVdF) were mixed at a weight ratio of 95:2.5:2.5. After addition of N-methyl-2-pyrrolidone (NMP) as a dispersion medium to the mixture, the mixture obtained was stirred using a mixer (manufactured by PRIMIX Corporation, T.K. HIVIS MIX) to prepare a positive electrode slurry. Next, the positive electrode slurry was applied to both the surfaces of a positive electrode current collector formed of an aluminum foil. The coating was dried, and then rolled with a rolling roller to prepare a positive electrode, on both the surfaces of a positive electrode current collector of which a positive electrode mixture layer having a density of 3.60 g/$cm^3$ was formed.

[Production of Non-Aqueous Electrolyte Secondary Battery]

A tab was attached to each of the above electrodes. The positive and negative electrodes each having the tab attached were spirally wound with the separator therebetween such that the tabs were located on the outermost periphery to produce a wound electrode assembly. The electrode assembly was inserted in an exterior body formed of an aluminum laminate sheet having a height of 62 mm and a width of 35 mm and dried in a vacuum at 105° C. for 2 hours. Then, the above non-aqueous electrolyte solution was injected thereto, and the opening exterior body was sealed to produce a non-aqueous electrolyte secondary battery. This battery has a designed capacity of 800 mAh.

(Charge/Discharge Cyclic Characteristics)

In the above non-aqueous electrolyte secondary battery, a charge/discharge cycle under the following charge and discharge conditions were repeated 200 times at a temperature of 25° C.

[Charge and Discharge Conditions]

After a constant current charging was carried out at a current of 1.0 It (800 mA) to a battery voltage of 4.2 V, constant voltage charging was carried out at a voltage of 4.2 V to a current value of 0.05 It (40 mA). After a quiescence of 10 minutes, constant current discharging was carried out at a current of 1.0 It (800 mA) to a battery voltage of 2.75 V.

[Capacity Retention after 200 Cycles]

The discharge capacity at the first cycle and the discharge capacity at the 200th cycle under the above charge and discharge conditions were measured to determine the capacity retention after 200th cycle by the following equation (1). The results are shown in Table 1.

Capacity retention after 200 cycles (%)=(discharge capacity at 200th cycle/discharge capacity at first cycle)×100    (1)

TABLE 1

|  | Surface layer | | Negative electrode | Battery characteristics |
| --- | --- | --- | --- | --- |
|  | Fluorine resin | Fluorine resin content | slurry pH | Capacity retention after 200 cycles |
| Example 1 | PTFE | 0.1 wt % | 9.2 | 81% |
| Example 2 | PTFE | 1 wt % | 8.5 | 81% |
| Example 3 | PTFE | 2 wt % | 8.2 | 82% |
| Example 4 | PTFE | 5 wt % | 8.1 | 80% |
| Example 5 | PVDF | 1 wt % | 9.1 | 80% |
| Example 6 | PFA | 1 wt % | 8.7 | 81% |
| Example 7 | ETFE | 1 wt % | 9.3 | 79% |
| Comparative Example 1 | None | — | 11.2 | 67% |

The non-aqueous electrolyte secondary batteries of Examples 1 to 7 using the negative electrode active material in which a surface layer including a fluorine resin is formed on the surface of the composite particles exhibited a higher capacity retention value after 200 cycles, in comparison with the non-aqueous electrolyte secondary battery of Comparative Example 1 using the negative electrode active material composite particles in which no surface layer including a fluorine resin is formed on the surface of the composite particles, and the deterioration in the charge/discharge cyclic characteristics was suppressed.

REFERENCE SIGNS LIST

10 negative electrode active material particle
11 silicate phase
12 silicon particles
13 composite particle
14 surface layer
15 conductive layer

The invention claimed is:

1. A negative electrode active material for a non-aqueous electrolyte secondary battery, comprising:
   a composite particle including a silicate and silicon; and
   a surface layer coating the composite particle, wherein
   the surface layer includes a fluorine resin, wherein
   the fluorine resin includes at least one of the group consisting of non-sulfonated perfluoroethylene propene copolymer (FEP), non-sulfonated polychlorotrifluoroethylene (PCTFE), and non-sulfonated ethylene chlorotrifluoroethylene copolymer (ECTFE), wherein
   the composite particle includes a silicate phase and silicon particles dispersed in the silicate phase, wherein the silicate phase is an aggregate of silicate particles,
   the silicon particles constitute from 20 mass % to 95 mass % of a total mass of the composite particle, and
   the composite particle has a half width of a diffraction peak of the (111) plane of the silicate of 0.05° or more and 0.55° or less in an XRD pattern obtained by XRD measurement.

2. The negative electrode active material for a non-aqueous electrolyte secondary battery according to claim 1, wherein
   the silicate includes a lithium silicate represented by $Li_xSiO_y$, wherein $0<x\le4$ and $0<y\le4$.

3. The negative electrode active material for a non-aqueous electrolyte secondary battery according to claim 1, wherein
   the silicon has an average particle size in the range of 1 nm to 1000 nm.

4. The negative electrode active material for a non-aqueous electrolyte secondary battery according to claim 1, wherein
   the surface layer has a thickness in the range of 1 nm to 3000 nm.

5. The negative electrode active material for a non-aqueous electrolyte secondary battery according to claim 1, wherein
   an amount of the fluorine resin is in the range of 0.01 mass % to 10 mass % with respect to a total mass of the composite particle.

6. A negative electrode, including the negative electrode active material for a non-aqueous electrolyte secondary battery according to claim 1.

7. The negative electrode according to claim 6, including a binder, wherein
   the binder is a binder including no fluorine.

8. A non-aqueous electrolyte secondary battery, comprising:
   the negative electrode according to claim 6;
   a positive electrode; and
   a non-aqueous electrolyte.

9. The negative electrode active material for a non-aqueous electrolyte secondary battery according to claim 1, wherein
   the fluorine resin includes at least one of the group consisting of non-sulfonated perfluoroethylene propene copolymer (FEP) and non-sulfonated ethylene chlorotrifluoroethylene copolymer (ECTFE).

10. A negative electrode for a non-aqueous electrolyte secondary battery, comprising:
    a negative electrode current collector; and
    a negative electrode mixture layer formed on the negative electrode current collector; and
    a negative electrode active material contained in the negative electrode mixture layer,
    the negative electrode active material is a composite particle including a silicate and silicon; and
    a surface layer coating the composite particle, wherein
    the surface layer includes a fluorine resin, wherein the fluorine resin includes at least one of the group consisting of non-sulfonated perfluoroalkoxy alkane (PFA), non-sulfonated perfluoroethylene propene copolymer (FEP), non-sulfonated polychlorotrifluoroethylene (PCTFE), and non-sulfonated ethylene chlorotrifluoroethylene copolymer (ECTFE), wherein
    the fluorine resin is present at a surface of the negative electrode mixture layer that contacts the negative electrode current collector, and
    the fluorine resin is also present at a surface of the negative electrode mixture layer opposite the surface that contacts the negative electrode current collector, wherein
    the composite particle includes a silicate phase and silicon particles dispersed in the silicate phase, wherein the silicate phase is an aggregate of silicate particles,
    the silicon particles constitute from 20 mass % to 95 mass % of a total mass of the composite particle, and
    the composite particle has a half width of a diffraction peak of the (111) plane of the silicate of 0.05° or more and 0.55° or less in an XRD pattern obtained by XRD measurement.

11. The negative electrode active material for a non-aqueous electrolyte secondary battery according to claim 10, wherein
    the silicate includes a lithium silicate represented by $Li_xSiO_y$, wherein $0<x\le4$ and $0<y\le4$.

12. The negative electrode active material for a non-aqueous electrolyte secondary battery according to claim 10, wherein the silicon has an average particle size in the range of 1 nm to 1000 nm.

13. The negative electrode active material for a non-aqueous electrolyte secondary battery according to claim 10, wherein the surface layer has a thickness in the range of 1 nm to 3000 nm.

14. The negative electrode active material for a non-aqueous electrolyte secondary battery according to claim 10, wherein an amount of the fluorine resin is in the range of 0.01 mass % to 10 mass % with respect to a total mass of the composite particle.

15. A negative electrode, including the negative electrode active material for a non-aqueous electrolyte secondary battery according to claim 10.

16. The negative electrode according to claim 15, including a binder, wherein the binder is a binder including no fluorine.

17. A non-aqueous electrolyte secondary battery, comprising:

the negative electrode according to claim 15;

a positive electrode; and a non-aqueous electrolyte.

18. The negative electrode active material for a non-aqueous electrolyte secondary battery according to claim 10, wherein the fluorine resin includes at least one of the group consisting of non-sulfonated perfluoroethylene propene copolymer (FEP) and non-sulfonated ethylene chlorotrifluoroethylene copolymer (ECTFE).

* * * * *